United States Patent
Nakamura et al.

(10) Patent No.: US 9,274,017 B2
(45) Date of Patent: Mar. 1, 2016

(54) MEMS DEVICE

(71) Applicant: KABUSHIKI KAISHA TOSHIBA, Minato-ku, Tokyo (JP)

(72) Inventors: Naofumi Nakamura, Tokyo (JP); Kei Masunishi, Kawasaki (JP); Yumi Hayashi, Zama (JP); Yusaku Asano, Yokohama (JP); Tamio Ikehashi, Yokohama (JP); Jun Deguchi, Kawasaki (JP); Daiki Ono, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 203 days.

(21) Appl. No.: 14/188,342

(22) Filed: Feb. 24, 2014

(65) Prior Publication Data
US 2015/0068314 A1 Mar. 12, 2015

(30) Foreign Application Priority Data

Sep. 6, 2013 (JP) .................................. 2013-185606

(51) Int. Cl.
*G01L 9/12* (2006.01)
*G01L 19/04* (2006.01)
*G01L 9/00* (2006.01)

(52) U.S. Cl.
CPC ............... *G01L 19/04* (2013.01); *G01L 9/0072* (2013.01); *G01L 9/0075* (2013.01)

(58) Field of Classification Search
CPC ..... G01L 9/0075; G01L 9/008; G01L 9/0072; G01L 13/025; G01L 7/00
USPC .................... 73/724, 723, 718, 717, 715, 700
See application file for complete search history.

(56) References Cited

U.S. PATENT DOCUMENTS

| | | | | |
|---|---|---|---|---|
| 6,631,645 | B1* | 10/2003 | Satou | G01L 9/125 73/718 |
| 8,004,053 | B2* | 8/2011 | Miyagi | B81B 3/0078 257/417 |
| 8,309,858 | B2* | 11/2012 | Kojima | B81C 1/00476 174/260 |
| 2013/0234263 | A1 | 9/2013 | Ikehashi | |

FOREIGN PATENT DOCUMENTS

JP 2000-131173 A 5/2000

OTHER PUBLICATIONS

Hitchaci, Capacitance-Type Physical Sensor, JP 2000-131173.*

(Continued)

*Primary Examiner* — Lisa Caputo
*Assistant Examiner* — Nigel Plumb
(74) *Attorney, Agent, or Firm* — Holtz, Holtz & Volek PC

(57) ABSTRACT

According to one embodiment, a MEMS device is disclosed. The device includes a substrate, a first and second MEMS elements on the substrate. Each of the first and second MEMS elements includes a fixed electrode on the substrate, a movable electrode above the fixed electrode, a first insulating film, the first insulating film and the substrate defining a cavity in which the fixed and movable electrodes are contained, and a first anchor on a surface of the first insulating film inside the cavity and configured to connect the movable electrode to the first insulating film. The cavity of the first MEMS element is closed. The cavity of the second MEMS element is opened by a through hole.

20 Claims, 13 Drawing Sheets

(56) References Cited

OTHER PUBLICATIONS

Y. Zhang, et al.: "A High-Sensitive Ultra-Thin MEMS Capacitive Pressure Sensor", IEEE, Jun. 5-9, 2011, pp. 112-115 (in English).

Klaus Kasten, et al.: "Capacitive pressure sensor with monolithically integrated CMOS readout circuit for high temperature applications", Sensors and Actuators A, 97-98 (2002), pp. 83-87 (in English).

* cited by examiner

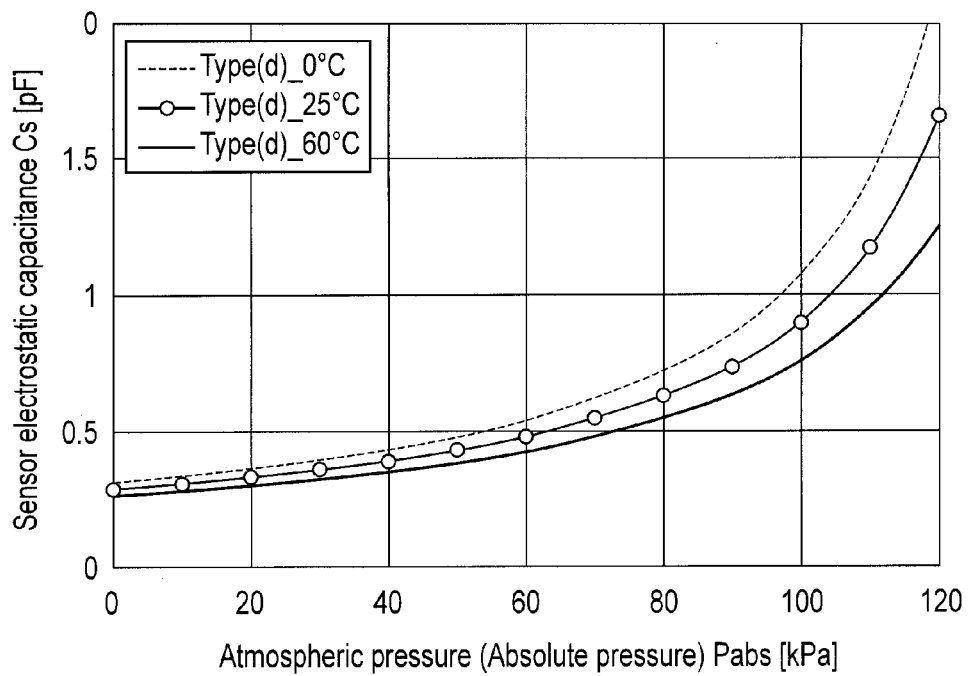
F I G. 4
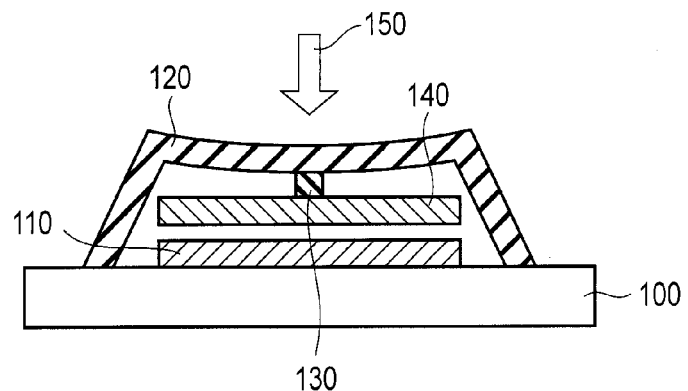
F I G. 5
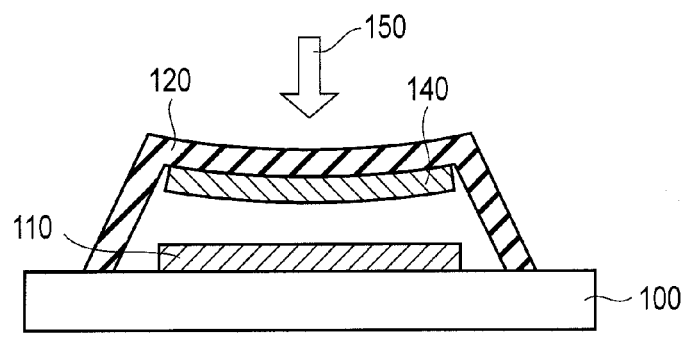
F I G. 6

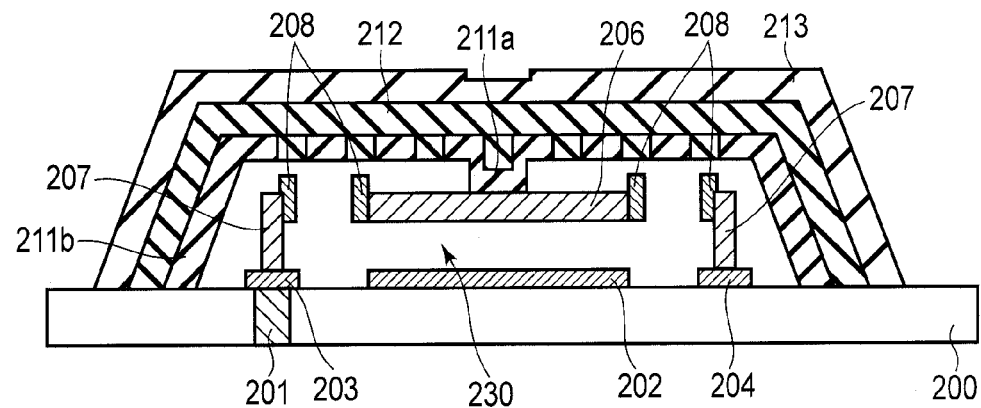
F I G. 7
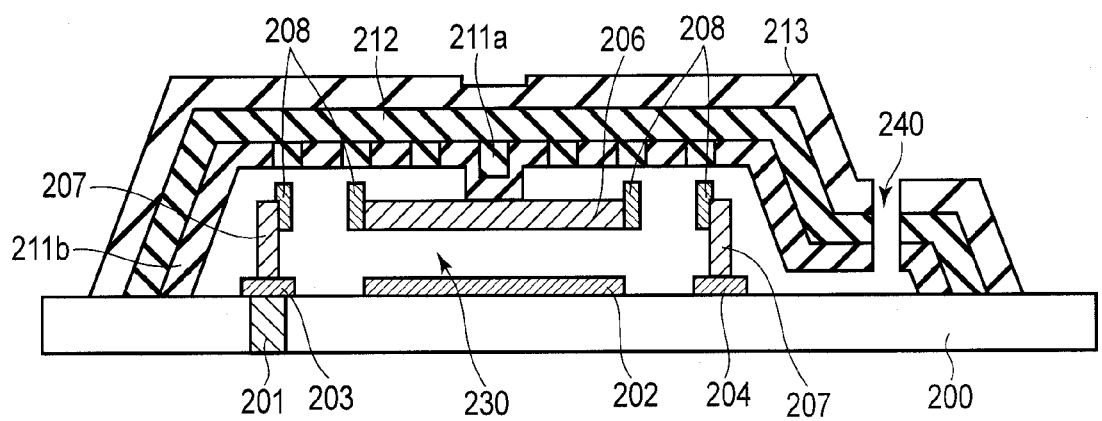
F I G. 8

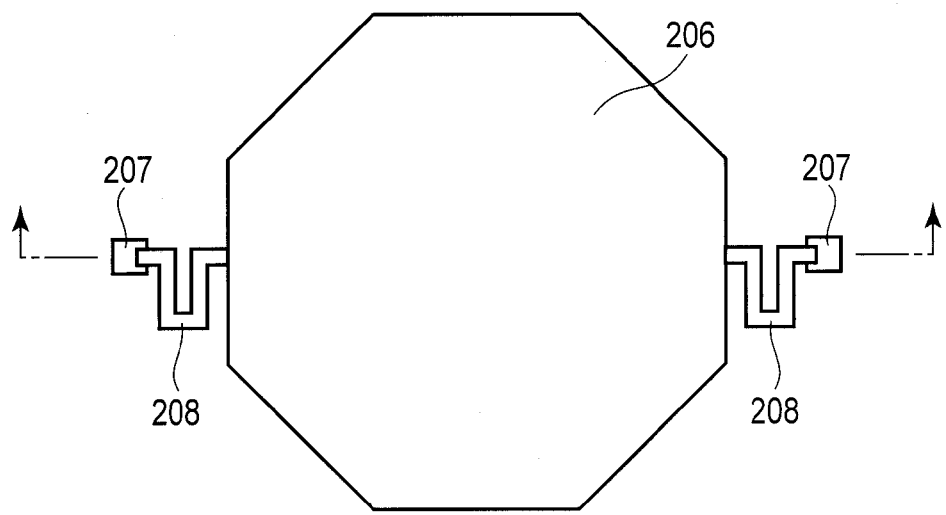
F I G. 9
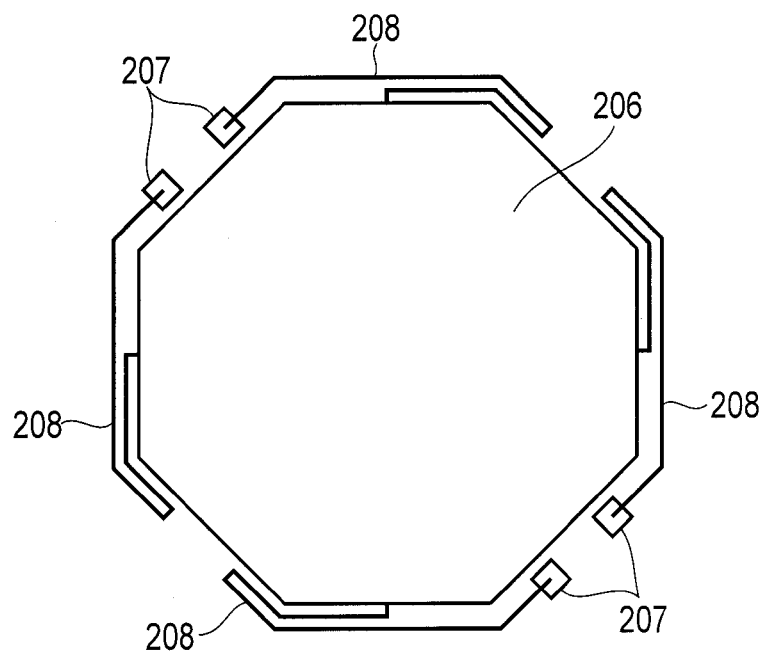
F I G. 10

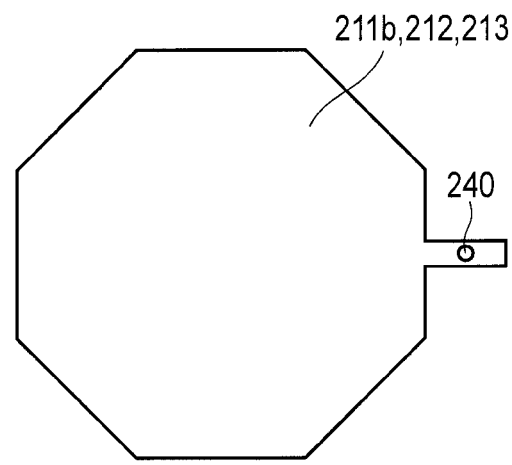
F I G. 11
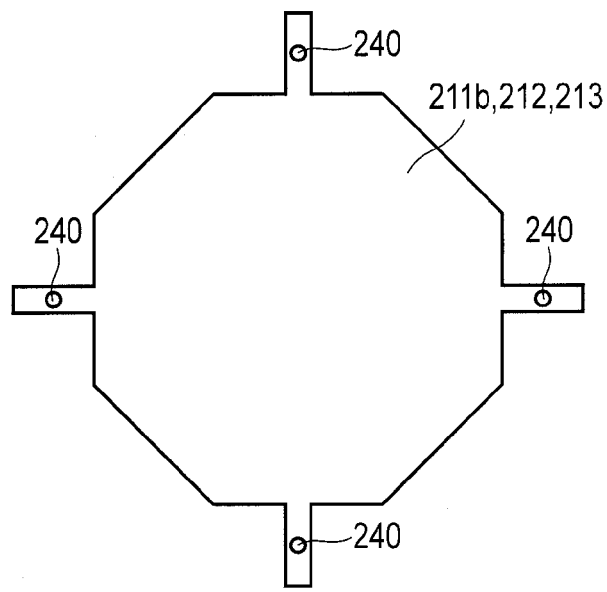
F I G. 12

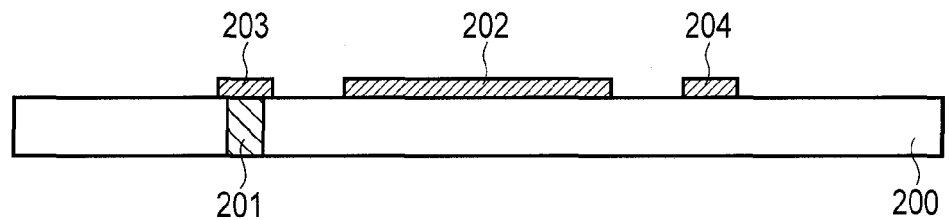
F I G. 13
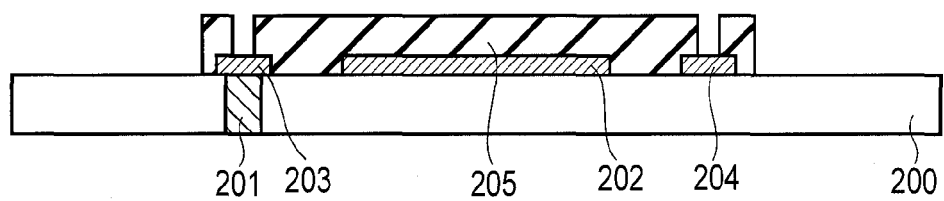
F I G. 14
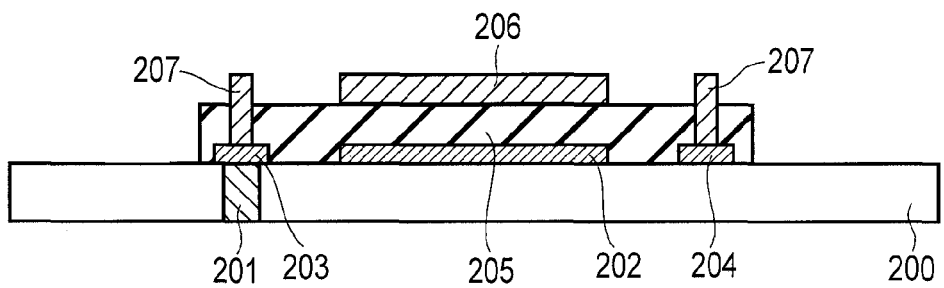
F I G. 15

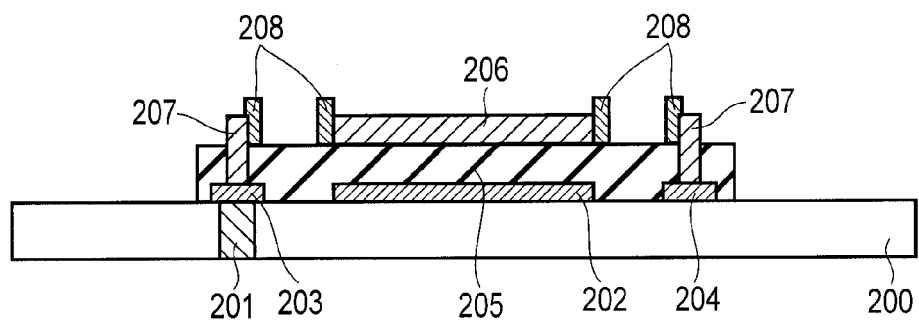
F I G. 16
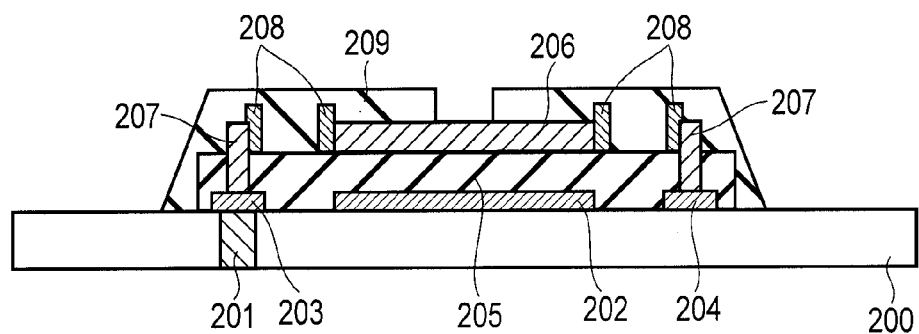
F I G. 17

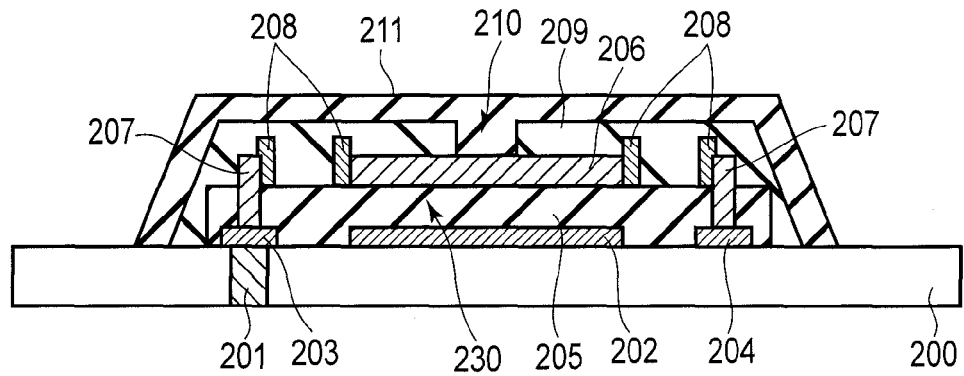
F I G. 18
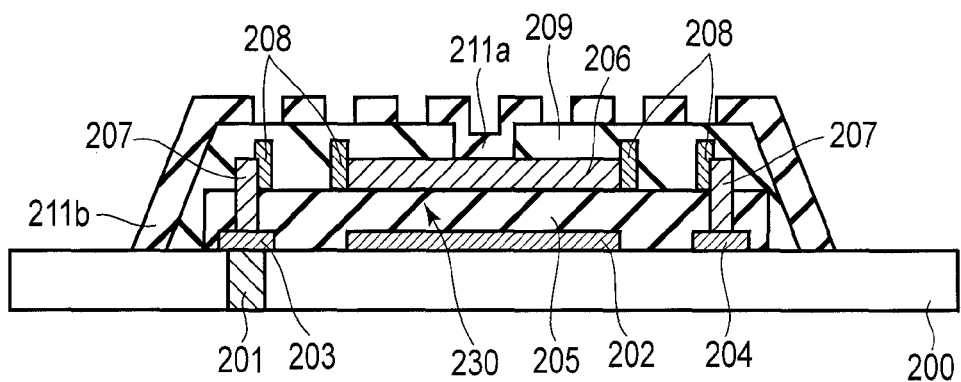
F I G. 19

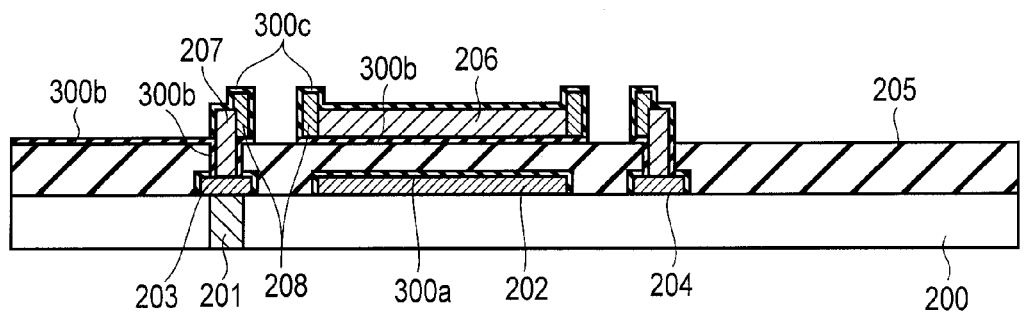
F I G. 28
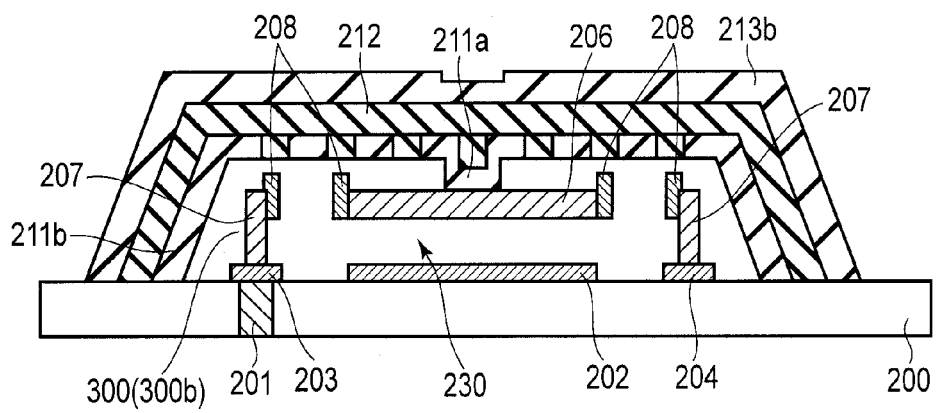
F I G. 29

MEMS DEVICE

CROSS-REFERENCE TO RELATED APPLICATIONS

This application is based upon and claims the benefit of priority from Japanese Patent Application No. 2013-185606, filed Sep. 6, 2013, the entire contents of which are incorporated herein by reference.

FIELD

Embodiments described herein relate generally to a MEMS (Micro Electro Mechanical Systems) device including a MEMS element.

BACKGROUND

A MEMS pressure sensor is known as one of the devices utilizing MEMS elements. The MEMS pressure sensor comprises a substrate, a fixed electrode (lower electrode), a movable electrode (upper electrode) and a diaphragm (domed thin film). The fixed electrode is formed on the substrate. The movable electrode is formed on the inner upper surface of the diaphragm.

When the diaphragm is sagged by pressure, the distance between the fixed and movable electrodes varies, thereby varying the electrostatic capacitance therebetween. The MEMS pressure sensor employs a principle that pressure is detected utilizing the relationship between pressure and electrostatic capacitance. There is a demand for high detection accuracy.

BRIEF DESCRIPTION OF THE DRAWINGS

FIG. 4 is a graph showing the pressure dependency of the capacitance of a pressure sensing MEMS element;

FIG. 5 is a cross-sectional view for explaining the motion of a movable electrode when pressure is applied to the diaphragm of the MEMS element according to the first embodiment;

FIG. 6 is a cross-sectional view for explaining the motion of a movable electrode when pressure is applied to the diaphragm of a MEMS element of a comparative example;

FIG. 7 is a schematic cross-sectional view of a pressure sensing MEMS element in a MEMS pressure sensor according to a second embodiment;

FIG. 8 is a schematic cross-sectional view of a reference capacitance MEMS element in the MEMS pressure sensor of the second embodiment;

FIG. 9 is a plan view showing a plane pattern of a movable electrode, anchors and springs in the MEMS element of the second embodiment;

FIG. 10 is a plan view showing another plane pattern of the movable electrode, anchors and springs in the MEMS element of the second embodiment;

FIG. 11 shows a plane pattern example of a diaphragm of the reference capacitance MEMS element of the second embodiment;

FIG. 12 shows a plane pattern example of a diaphragm with four through holes;

FIG. 13 is a cross-sectional view for explaining a method for manufacturing the MEMS element of the second embodiment;

FIG. 14 is a cross-sectional view for explaining the method for manufacturing the MEMS element of the second embodiment subsequent to the step of FIG. 13;

FIG. 15 is a cross-sectional view for explaining the method for manufacturing the MEMS element of the second embodiment subsequent to the step of FIG. 14;

FIG. 16 is a cross-sectional view for explaining the method for manufacturing the MEMS element of the second embodiment subsequent to the step of FIG. 15;

FIG. 17 is a cross-sectional view for explaining the method for manufacturing the MEMS element of the second embodiment subsequent to the step of FIG. 16;

FIG. 18 is a cross-sectional view for explaining the method for manufacturing the MEMS element of the second embodiment subsequent to the step of FIG. 17;

FIG. 19 is a cross-sectional view for explaining the method for manufacturing the MEMS element of the second embodiment subsequent to the step of FIG. 18;

FIG. 28 is a cross-sectional view for explaining the method for manufacturing the MEMS element of the third embodiment subsequent to the step of FIG. 27;

FIG. 29 is a schematic cross-sectional view of a pressure sensing MEMS element in a MEMS pressure sensor according to a fourth embodiment;

DETAILED DESCRIPTION

Referring now to the accompanying figures, embodiments will be described.

In general, according to one embodiment, a MEMS device is disclosed. The MEMS device comprises a substrate; a first MEMS element provided on the substrate; and a second MEMS element provided on the substrate. Each of the first and second MEMS elements comprises a fixed electrode fixed on the substrate; a movable electrode arranged above the fixed electrode and being movable vertically; a first insulating film, the first insulating film and the substrate defining a cavity in which the fixed electrode and the movable electrode are contained; and a first anchor provided on a surface of the first insulating film inside the cavity and configured to connect the movable electrode to the first insulating film. In the first MEMS element, the cavity defined by the first insulating film and the substrate is closed. In the second MEMS element, the cavity defined by the first insulating film and the substrate is opened by a through hole.

First Embodiment

In the embodiment below, a MEMS pressure sensor will be described as an example of one of the MEMS devices. However, the embodiment is not limited to the MEMS pressure sensor. The MEMS pressure sensor of each embodiment is used as a pressure sensor for smartphones (such as a height indicator or an activity monitor), a healthcare pressure sensor, a vehicle pressure sensor (a side collision sensor, TPMS (Tire Pressure Monitoring System)).

Figure 1:
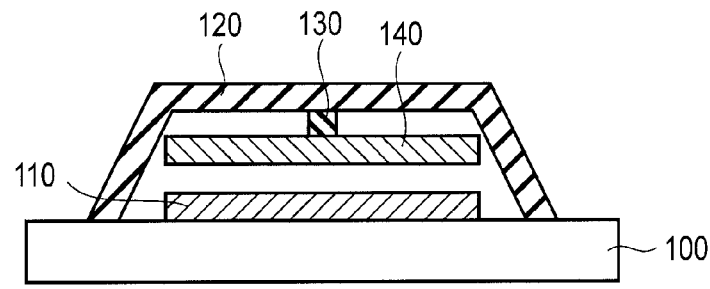
FIG. 1 is a schematic cross-sectional view of a pressure sensing MEMS element in a MEMS pressure sensor according to a first embodiment.
Figure 2:
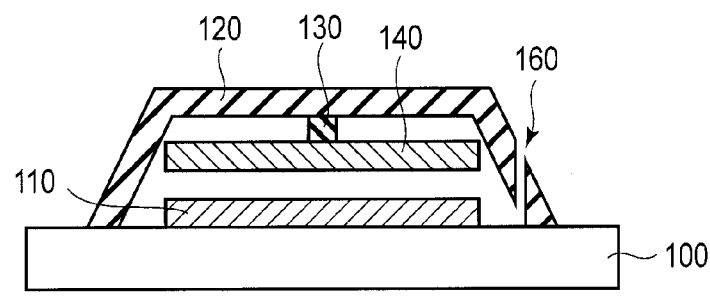
FIG. 2 is a schematic cross-sectional view of a reference capacitance MEMS element in the MEMS pressure sensor according to the first embodiment.

FIG. 1 is a schematic cross-sectional view of a pressure sensing MEMS element in a MEMS pressure sensor of the present embodiment. FIG. 2 is a schematic cross-sectional view of a reference capacitance MEMS element for the MEMS pressure sensor according to the present embodiment.

In FIGS. 1 and 2, reference number 100 denotes a substrate, on which a fixed electrode (lower electrode) 110 is provided. The fixed electrode 110 has, for example, a flat plate shape. Material of the fixed electrode 110 is, for example, AlCu alloy. A diaphragm (domed thin film) 120 is provided over the substrate 100 to contain therein the fixed electrode 110.

An anchor 130 is provided on the inner upper surface of the diaphragm 120. A movable electrode (upper electrode) 140 is connected to the inner upper surface of the diaphragm 120 via the anchor 130. For instance, the movable electrode has a flat plate shape in parallel with the fixed electrode. Material of the movable electrode 140 is, for example, AlCu alloy, and opposed to the fixed electrode 110.

The above configuration is shared between the pressure sensing MEMS element and the reference capacitance MEMS element.

The reference capacitance MEMS element differs from the pressure sensing MEMS element in that the diaphragm 120 of the reference capacitance MEMS element has a through hole 160. Thus, in the reference capacitance MEMS element, the cavity defined between the diaphragm 120 and the substrate 100, which contains the fixed electrode 110 and the movable electrode 140, is partially opened by the through hole 160. For that reason, the opened cavity communicates with the space outside the MEMS element via the through hole 160. In other words, the opened cavity is connected to the atmosphere or external air outside the MEMS element.

Figure 3:
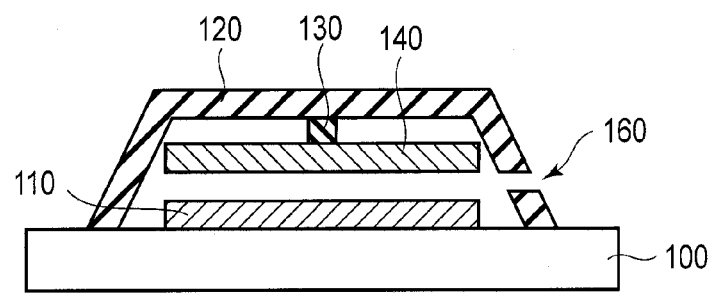
FIG. 3 is a schematic cross-sectional view of another reference capacitance MEMS element in the MEMS pressure sensor according to the first embodiment.
Figure 20:
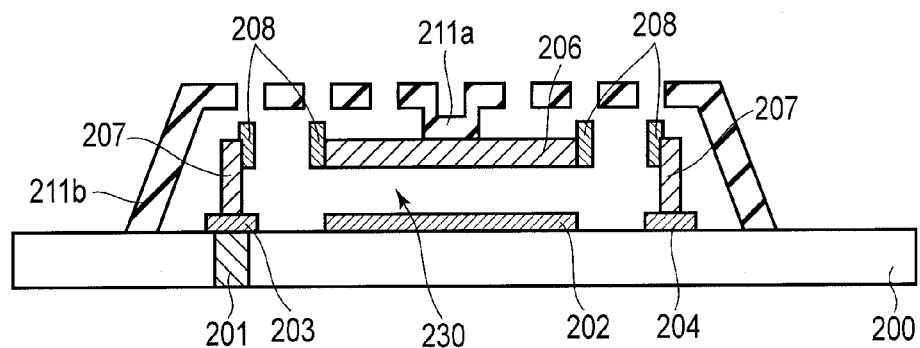
FIG. 20 is a cross-sectional view for explaining the method for manufacturing the MEMS element of the second embodiment subsequent to the step of FIG. 19.

In FIG. 2, the through hole 160 is perpendicular to the substrate 100. However, it may be parallel to the substrate 100 as shown in FIG. 3.

The pressure sensing MEMS element and the reference capacitance MEMS element are formed on the same substrate by the same process, except for the presence or absence of the step of forming the through hole 160. Therefore, characteristic variations of the pressure sensing and reference capacitance MEMS elements due to variations in element manufacturing process exhibit nearly similar tendencies. This results in reducing the influence of manufacturing variations on the difference between the capacitances of the pressure sensing MEMS element and the reference capacitance MEMS element.

Further, since the pressure sensing and reference capacitance MEMS elements have substantially the same structure except for the presence or absence of the through hole 160, they exhibit substantially the same dependency of electrostatic capacitance on temperature.

Furthermore, since the diaphragm 120 of the reference capacitance MEMS element has the through hole 160, the temperature in the space (cavity) for operating the movable electrode 140 of the reference capacitance MEMS element changes when the outside atmosphere changes. The temperature dependencies of the capacitances of the pressure sensing and reference capacitance MEMS elements are nearly same, so that the influence due to temperature dependency of the capacitance of the pressure sensing MEMS element can be corrected based on the temperature dependency of the capacitance of the reference capacitance MEMS element.

FIG. 4 shows the pressure dependencies of the electrostatic capacitances of the pressure sensing MEMS element at three temperatures 0° C., 25° C. and 60° C. From FIG. 4, it can be understood that the electrostatic capacitance Cs varies at different temperatures even under the same atmospheric pressure (absolute pressure) Pabs. Therefore, by considering the temperature dependency of the electrostatic capacitance, the sensing accuracy of the MEMS device can be enhanced.

If the pressure 150 is applied to the diagram 120 of the MEMS element of the first embodiment, the movable electrode 130 downwardly displaces in parallel without sagging, although the diagram 120 sags, as is shown in FIG. 5. Accordingly, in the present embodiment, the distance between the movable electrode 130 and the fixed electrode 110 does not change even at a position away from the center of the diagram 120.

In contrast, as is shown in FIG. 6, where the entire surface of the movable electrode 130 is coupled to the inner upper surface of the diagram 120 (comparative example), if the diagram 120 sags due to pressure 150, the movable electrode 130 also sags. Accordingly, in the comparative example, the distance between the movable electrode 130 and the fixed electrode 110 is longer at a position remoter from the center of the diagram 120.

Thus, when the embodiment is compared with the comparative example in the case that the diagram 120 is sagged by same magnitude of pressure 150, the average distance between the movable electrode 130 and the fixed electrode 110 is shorter in the embodiment than in the comparative example. Therefore, the present embodiment can provide the MEMS element with greater change in capacitance even the same magnitude of pressure. This also enables the detection accuracy of the MEMS element to be higher.

The rates of change of the electrostatic capacitance in the embodiment and the comparative example will be described in more detail.

Comparative Example

The deformation distribution of the diagram with pressure P applied thereto is given by $$w(r)=P(1-r^2/a^2)a^4/(64D) \quad (1)$$

$$D=Eh^3/\{12(1-v^2)\} \quad (2)$$

where
r is the distance from the center of the diagram;
w(r) is the amount of sagging of the diagram at the distance r from the center of the diagram;
a is the radius of the diagram;
P is the pressure applied to the diagram;
D is the bending rigidity of the diagram;
E is the Yong's modulus of the diagram; and
ν is the Poisson's ratio The maximum sagging amount $w_{max}$ of the diagram, i.e., the sagging amount w(0) of the diagram at its center, is given by $$w_{max} = w(0) = Pa^4/(64D) = 3(1-v^2)Pa^4/(16Eh^3) \quad (3)$$

Accordingly, the electrostatic capacitance obtained when the pressure P is applied is given by $$C_{old} = C_0 \sqrt{\frac{g_0}{w_{max}}} \tanh^{-1} \sqrt{\frac{w_{max}}{g_0}} \quad (4)$$

where
$C_{old}$ is the sensor capacitance of the comparative example;
$C_0 = \in \pi a^2/g_0$ is the sensor capacitance (initial capacitance);
$\in$ is the dielectric constant of the air; and
$g_0$ is the initial gap between the movable electrode and the fixed electrode before the application of pressure.

The rate of change of the electrostatic capacitance is given by $$\frac{\Delta C_{old}}{C_0} = \frac{C_{old} - C_0}{C_0} \quad (5)$$

$$= \sqrt{\frac{g_0}{w_{max}}} \tanh^{-1} \sqrt{\frac{w_{max}}{g_0}} - 1$$

where
$\Delta C_{old}/C_0 = (C_{old} - C_0)/C_0$ is the rate of change of the comparative sensor.

Embodiment

Among the parameters and constants used in the following equations associated with the embodiment, the same parameters and constants as those used in the comparative example have the same meanings as in the comparative example.

The electrostatic capacitance obtained when the pressure P is applied is given by $$C_{new} = \in \pi a^2/(g_0 - w_{max}) \quad (6)$$

where $C_{new}$ is the sensor capacitance of the embodiment.

The rate of change of the electrostatic capacitance is given by $$\Delta C_{new}/C_0 = (C_{new} - C_0)/C_0 = w_{max}/(g_0 - w_{max}) \quad (7)$$

where $\Delta C_{new}/C_0$ is the change rate of the capacitance of the sensor of the embodiment.

Second Embodiment

FIG. 7 is a schematic cross-sectional view of a pressure sensing MEMS element in a MEMS sensor according to the present embodiment, and FIG. 8 is a schematic cross-sectional view of a reference capacitance MEMS element in the MEMS sensor of the present embodiment.

In FIGS. 7 and 8, reference number 200 denotes a substrate, and a plug 201 is provided in the substrate 200. The plug 201 is connected to an unshown on interconnect formed on below the substrate 200.

A fixed electrode (lower electrode) 202, and interconnects 203 and 204 are provided on the substrate 200. The interconnects 203 and 204 are provided outside the fixed electrode 202. The interconnect 203 is in contact with the plug 201. Anchors 207 are provided on the interconnects 203 and 204.

Diagrams 211b, 212 and 213 are provided on the substrate 100 to contain the fixed electrode 202, the interconnects 203 and 204, the anchors 207, etc.

An anchor 211a is provided on the inner upper surface of the diagrams 211b, 212 and 213. A movable electrode (upper electrode) 206 is connected to the inner upper surface of the diagrams 211b, 212 and 213 via the anchor 211a. The movable electrode 206 is arranged to be opposed to the fixed electrode 202.

Springs 208 that connect the movable electrode 206 to the anchors 207 are formed continuously from the upper surface of the movable electrode 206 onto the upper surfaces of the anchors 207.

FIG. 9 shows a plane pattern example of the movable electrode 206, the anchors 207 and the springs 208. The cross-sectional view of FIG. 7 is taken along the line indicated by the arrows of FIG. 9. FIG. 10 shows another plane pattern example of the movable electrode 206, the anchors 207 and the springs 208.

The above configuration is shared between both the pressure sensing and reference capacitance MEMS elements. The reference capacitance MEMS element is differs from the pressure sensing capacitance MEMS element in that the diagrams 211b, 212 and 213 of the reference capacitance MEMS element has a through hole 240.

FIG. 11 shows a plane pattern example of the diagrams 211b, 212 and 213 of the reference capacitance MEMS element. This pattern is basically of a polygonal shape (octagon shape). However, compared to the diagrams 211b, 212 and 213 of the pressure sensing MEMS element, those of the reference capacitance MEMS element have extra portions for forming the through hole 240. The number of through hole 240 is not limited to one, but it may be two or more. FIG. 12 shows a plane pattern example of each diagram 211b, 212 or 213 having four through holes 240. The through holes 240 may be provided on the diaphragm 120.

The present embodiment can also improve the detection accuracy of the MEMS device for the same reason as that of the first embodiment.

A description will be given of an example of a method for manufacturing the MEMS element of the present embodiment.

[FIG. 13]

The plug 201 is formed in the substrate 200, and then the fixed electrode 202, and the interconnects 203 and 204 are formed on the substrate 200.

[FIG. 14]

A first sacrificial film 205 is formed on the substrate 200, thereafter the first sacrificial film 205 is processed into a predetermined shape such that parts of the upper surfaces of the interconnects 203 and 204 are exposed. The first sacrificial film 205 is an insulating film comprising, for example, organic material such as polyimide.

[FIG. 15]

A conductive film, which is to be processed into the movable electrode 206 and the anchors 207, is formed on the entire surface, then an unshown resist pattern is formed, and the conductive film is etched by using the resist pattern as a mask, thereby forming the movable electrode 206 and the anchors 207. The movable electrode 206 and the anchors 207 may be formed of different materials.

[FIG. 16]

A conductive film, which is to be processed into the springs 208 for connecting the movable electrode 206 to the anchors 207, is formed, then an unshown resist pattern is formed, and the conductive film is etched by using the resist pattern as a mask, thereby forming the springs 208.

In the present embodiment, although the movable electrode 206 and the anchors 207 are formed by the same layer, and the springs 208 is formed by another layer, all of the movable electrode 206, the anchors 207 and the springs 208 may be formed by the same layer. The material of the anchors 207 and the springs 208 may be different from the material of the movable electrode 206. The material of the anchors 207 and the springs 208 may be formed from, for example, insulating film such as silicon nitride film. Moreover, the anchors 207 and the springs 208 may comprise a mixture of metal and insulating material.

[FIG. 17]

The MEMS element obtained as a halfway product in the process up to FIG. 16 is coated with a second sacrifice film 209, and thereafter an opening 210 is formed in the second sacrifice film 209 to expose an upper surface portion of the movable electrode 206. The second sacrifice film 209 is obtained, for example, by forming a coating film of an organic material such as polyimide, and then processing the entire surface of the coating film by RIE process.

[FIG. 18]

An insulating film 211, which is to be processed into an anchor (first anchor) and a first diagram, is formed on the second sacrifice film 209 so that the opening 210 is closed by the insulating film 211. Material of the film 211 is, for example, silicon oxide.

[FIG. 19]

By using an unshown resist pattern as a mask, the film 211 is etched to form the anchor (first anchor) 211a connected to the movable electrode 206, and the first diagram 211b having a plurality of through holes. The resist pattern (not shown) is formed by ordinary photolithography process.

[FIG. 20]

The above-mentioned unshown resist pattern is removed by ashing using oxygen gas. At this time, the oxygen gas is supplied to the second sacrifice film 209 through the through hole of the first diagram 211b. The second sacrifice film 209 is remove by the oxygen gas. When the second sacrifice film 209 is removed to expose the first sacrifice film 205, the first sacrifice film 205 is also removed by the oxygen gas. As a result, a cavity 230 as a space for permitting the movable portion of the MEMS element to work is formed.

After that, the second diagram 212 is formed on the first diagram 211b, and the third diagram 213 is formed on the second diagram 212.

The through hole of the first diagram 211b is closed by the second diagram 212. Material of the second diagram 212 is, for example, polyimide. Material of the third diagram 213 is, for example, silicon nitride.

In this manner, the pressure sensing MEMS element shown in FIG. 7 is obtained.

The reference capacitance MEMS element shown in FIG. 8 is obtained by forming the through hole 240 in the diagrams 211b, 212 and 213 using lithography or etching.

Third Embodiment

Figure 21:
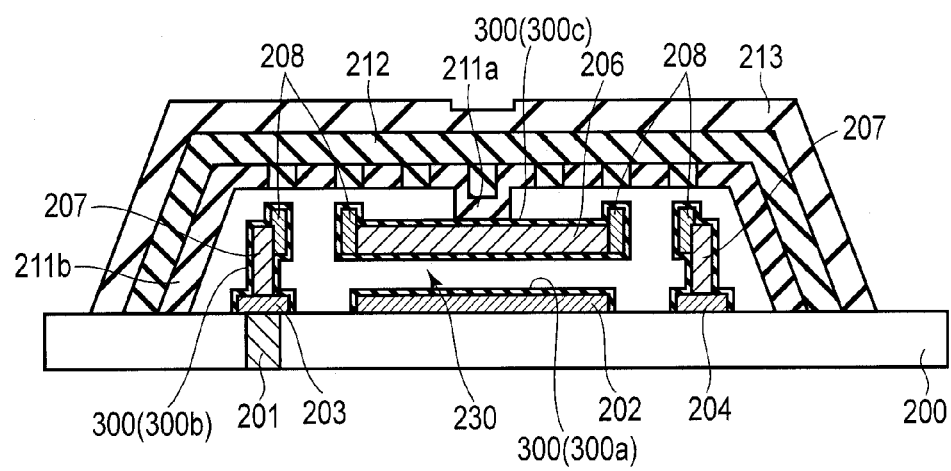
FIG. 21 is a schematic cross-sectional view of a pressure sensing MEMS element in a MEMS pressure sensor according to a third embodiment.
Figure 22:
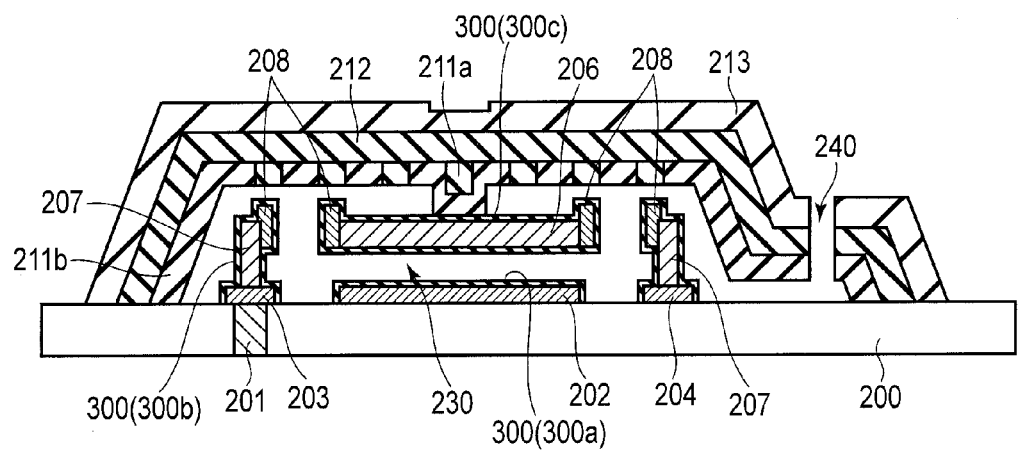
FIG. 22 is a schematic cross-sectional view of a reference capacitance MEMS element in the MEMS pressure sensor of the third embodiment.
Figure 23:
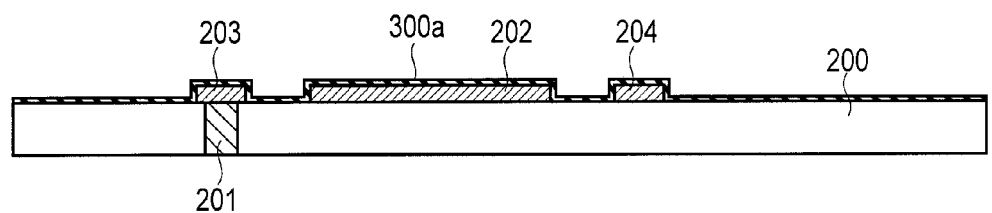
FIG. 23 is a cross-sectional view for explaining a method for manufacturing the MEMS element of the third embodiment.
Figure 24:
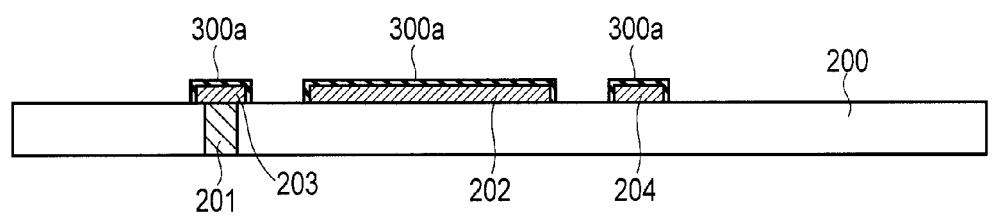
FIG. 24 is a cross-sectional view for explaining the method for manufacturing the MEMS element of the third embodiment subsequent to the step of FIG. 23.
Figure 25:
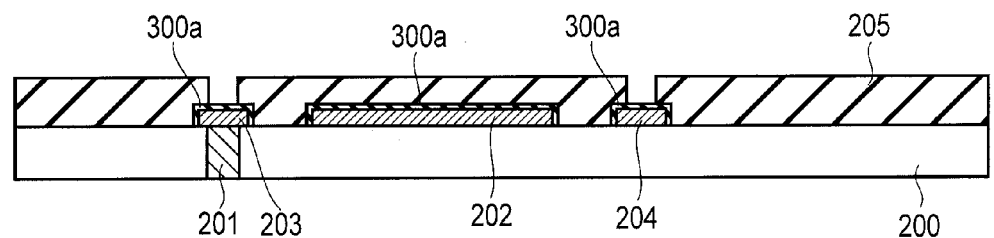
FIG. 25 is a cross-sectional view for explaining the method for manufacturing the MEMS element of the third embodiment subsequent to the step of FIG. 24.
Figure 26:
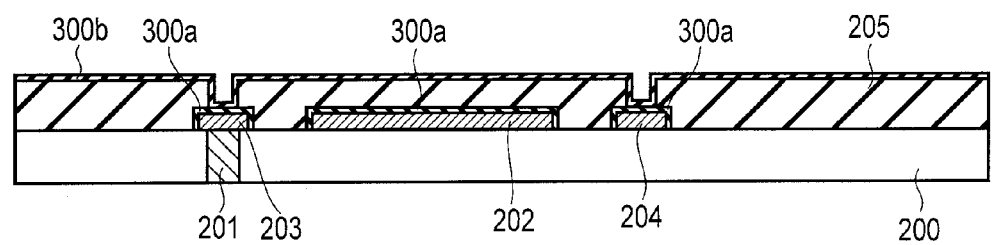
FIG. 26 is a cross-sectional view for explaining the method for manufacturing the MEMS element of the third embodiment subsequent to the step of FIG. 25.
Figure 27:
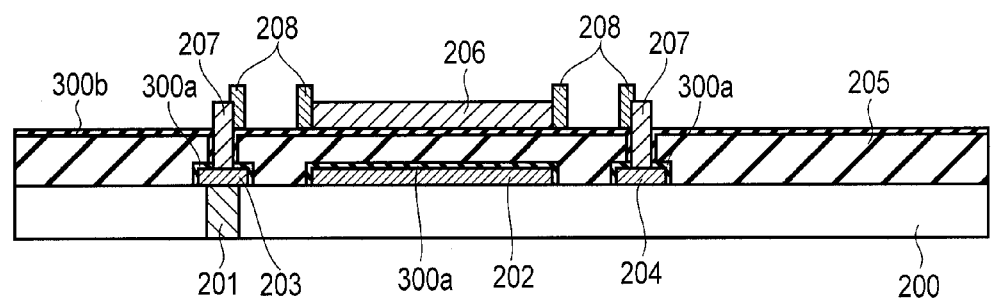
FIG. 27 is a cross-sectional view for explaining the method for manufacturing the MEMS element of the third embodiment subsequent to the step of FIG. 26.

FIG. 21 is a schematic cross-sectional view of a pressure sensing MEMS element in a MEMS pressure sensor according to a third embodiment, and FIG. 22 is a schematic cross-sectional view of a reference capacitance MEMS element in the MEMS pressure sensor of the third embodiment.

The present embodiment differs from the second embodiment in that the surfaces of the fixed electrode 202, the interconnects 203, 204, the movable electrode 206, the anchors 207 and the springs 208 of the present embodiment are covered with an insulating layer 300. Material of the insulating layer 300 is, for example, silicon nitride.

FIGS. 23 to 28 are cross-sectional view for explaining a method for manufacturing the MEMS element of the present embodiment. Here, the insulating film 300, which comprises a first insulating layer 300a, a second insulating layer 300b and a third insulating layer 300c, will be described.

[FIG. 23]

The fixed electrode 202, the interconnect 203, and the interconnect 204 are formed on the substrate 200, and thereafter the first insulating layer 300a is formed on the substrate 200, the fixed electrode 202, the interconnect 203, and the interconnect 204.

[FIG. 24]

By using lithography process and etching, a portion of the first insulating layer 300a is removed, which is other than the first insulating layer 300a on the top surfaces and side surfaces of the substrate 200, the fixed electrode 202, the interconnect 203 and the interconnect 204.

[FIG. 25]

The first sacrifice film 205 is formed on the entire surface of the resultant structure, and then openings are formed to expose upper surface portions of the interconnects 203, 204 by lithography process and etching.

[FIG. 26]

A second insulating layer 300b is formed on the first sacrifice film 205 to cover the side and bottom surfaces of the openings in the first sacrifice film 205. Material of the second insulating layer 300b is the same material as the first insulating layer 300a.

[FIG. 27]

The portions of the second insulating layer 300b on the bottoms of the openings in the first sacrifice film 205 are removed by lithography process and etching, and thereafter the movable electrode 206, the anchors 207 and the springs 208 are formed as in the case shown in FIGS. 15 and 16.

[FIG. 28]

A third insulating film 300c is formed on the entire surface of the resultant structure, and thereafter the third insulating layer 300c which is exposed on the top surface of the first sacrifice film 205, and the second insulating layer 300b which is below the exposed third insulating layer 300c, are selectively removed by using lithography process and etching. Material of the third insulating layer 300c is the same material as the second insulating layer 300b. After that, the same steps as those shown in FIG. 17 et seq. in the second embodiment are performed.

In the third embodiment, all of the fixed electrode 202, the interconnects 203, 204, the movable electrode 206, the anchors 207 and the springs 208 are covered with the insulating layer 300, but only one or some of these members may be covered with the insulating layer 300. For instance, only the surfaces of the fixed electrode 202 and the movable electrode 206 may be covered with the insulating layer 300. The members covered with the insulating layer 300 are protected from corrosion.

Fourth Embodiment

Figure 30:
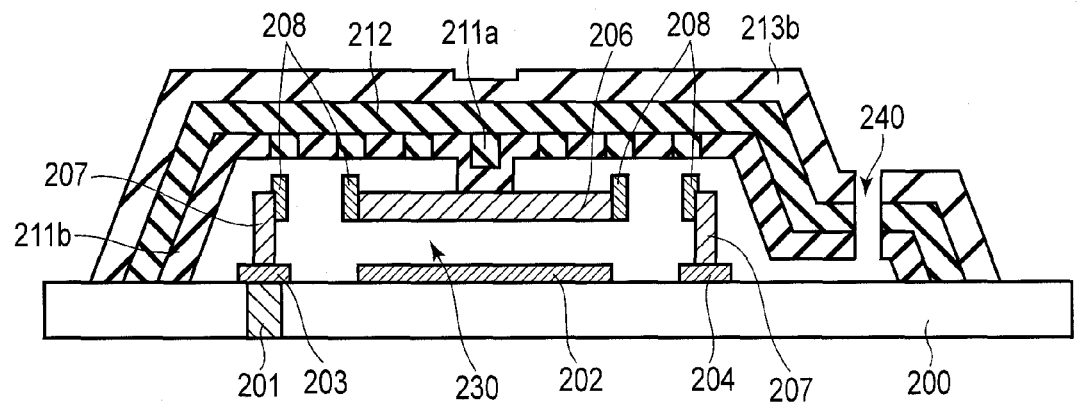
FIG. 30 is a schematic cross-sectional view of a reference capacitance MEMS element in the MEMS pressure sensor of the fourth embodiment.

FIG. 29 is a schematic cross-sectional view of a pressure sensing MEMS element in a MEMS pressure sensor of the present embodiment, and FIG. 30 is a schematic cross-sectional view of a reference capacitance MEMS element in the MEMS pressure sensor of the present embodiment.

The present embodiment differs from the second embodiment in that the material of the first diagram 211b and the material of the third diagram 213b are the same. The material of the first and third diagrams 211b, 213b is, for example, silicon oxide.

In the present embodiment, since the symmetrical property of the structure (material) of the diagrams 211b, 212, 213b is improved, warpages that occurs in the diagrams 211b, 212 and 213b due to thermal expansion difference are canceled, whereby the temperature dependency of their electrostatic capacitances can be reduced.

In the present embodiment, the fixed electrode 202, the interconnects 203 and 204, the movable electrode 206, the anchors 207 and the springs 208 may be covered with the insulating layer 300, as in the third embodiment.

Fifth Embodiment

Figure 31:
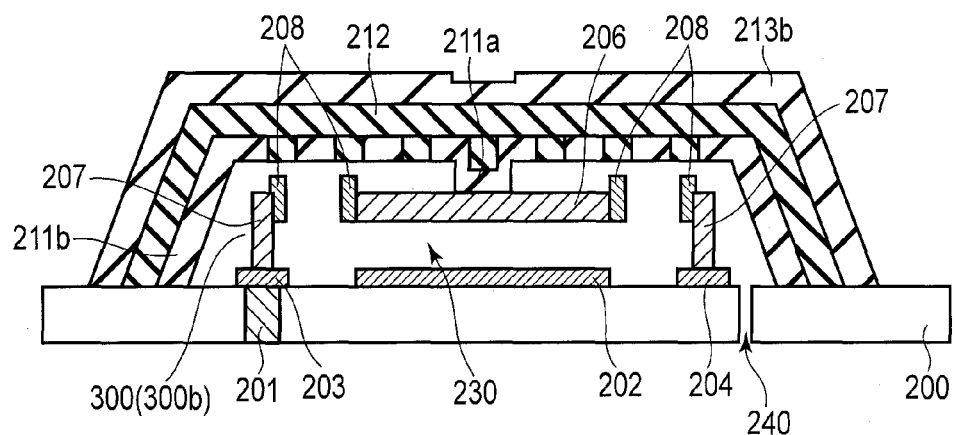
FIG. 31 is a schematic cross-sectional view of a reference capacitance MEMS element in a MEMS pressure sensor according to a fifth embodiment.

FIG. 31 is a schematic cross-sectional view of a reference capacitance MEMS element in a MEMS pressure sensor according to the present embodiment.

The present embodiment differs from the second embodiment in that the through hole 240 is not provided in the diagrams 211b, 212 and 213b, but is provided in the substrate 200.

In the first to third embodiments, the pressure sensing MEMS element differs from the reference capacitance MEMS element in that it has no through holes in the diaphragm. In contrast, in the present embodiment, the pressure sensing MEMS element and the reference capacitance MEMS element are identical to each other in structure (shape and dimensions), which can further reduce the slight difference of the temperature dependency that occurs due to the electrostatic difference between the pressure sensing MEMS element and the reference capacitance MEMS element.

In the present embodiment, the material of the first diagram 211b and the material of third diagram 213b may be same material, as in the second embodiment.

Further, in the present embodiment, at least one of the fixed electrode 202, the interconnects 203 and 204, the movable electrode 206, the anchors 207 and the springs 208 may be covered with the insulating layer 300, as in the third embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A MEMS device comprising:
a substrate;
a first MEMS element provided on the substrate; and
a second MEMS element provided on the substrate, each of the first and second MEMS elements comprising:
a fixed electrode fixed on the substrate;
a movable electrode arranged above the fixed electrode and being movable vertically;
a first insulating film, the first insulating film and the substrate defining a cavity in which the fixed electrode and the movable electrode are contained; and
a first anchor provided on a surface of the first insulating film inside the cavity and configured to connect the movable electrode to the first insulating film,
wherein in the first MEMS element, the cavity defined by the first insulating film and the substrate is closed, and wherein the second MEMS element, the cavity defined by the first insulating film and the substrate is opened by a through hole.

2. The MEMS device according to claim 1, wherein the through hole of the second MEMS element is provided in the first insulating film or the substrate.

3. The MEMS device according to claim 1, wherein each of the first and second MEMS elements further comprises:
a second anchor provided on the substrate outside the fixed electrode; and
a spring section extending from an upper surface of the movable electrode to an upper surface of the second anchor to connect the movable electrode to the first anchor.

4. The MEMS device according to claim 1, further comprising an insulating layer covering the fixed electrode and the movable electrode.

5. The MEMS device according to claim 4, wherein material of the insulating layer includes silicon nitride.

6. The MEMS device according to claim 1, wherein material of the fixed electrode and material of the movable electrode include AlCu alloy.

7. The MEMS device according to claim 1, wherein the first MEMS element is a pressure sensing MEMS element, and the second MEMS element is a reference capacitance MEMS element.

8. The MEMS device according to claim 1, wherein the fixed electrode has a flat plate shape, the movable electrode has a flat plate shape, and the fixed electrode and the movable electrode are opposed to each other.

9. The MEMS device according to claim 8, wherein the movable electrode having the flat plate shape vertically moves downward in response to pressure being applied to the first insulating film.

10. The MEMS device according to claim 1, further comprising a second insulating film provided on the first insulating film.

11. The MEMS device according to claim 10, further comprising a third insulating film provided on the second insulating film.

12. The MEMS device according to claim 11, wherein material of the first insulating film, material of the second insulating film, and material of the third insulating film are different from each other.

13. The MEMS device according to claim 12, wherein the material of the first insulating film is silicon oxide, the material of the second insulating film is organic matter, and the material of the third insulating film is silicon nitride.

14. The MEMS device according to claim 11, wherein the material of the first insulating film and the material of the third insulating film are same, and the material of the second insulating film is different from the materials of the first and second insulating films.

15. The MEMS device according to claim 11, wherein the materials of the first and second insulating films is silicon oxide, and the material of the second insulating film is organic matter.

16. The MEMS device according to claim 10, wherein the first insulating film has a plurality of openings, and the plurality of openings are filled with the second insulating film.

17. The MEMS device according to claim 10, wherein the second insulating film is a coating film.

18. The MEMS device according to claim 3, further comprising an insulating layer covering the movable electrode, the second anchor and the spring section.

19. The MEMS device according to claim 10, wherein no through hole is provided in the first insulating film of the first MEMS element.

20. The MEMS device according to claim 2, wherein no through hole is provided in the substrate below the cavity which contains the fixed and movable electrodes of the first MEMS element.

* * * * *